June 23, 1953   O. C. NORTON   2,642,951
DEHYDRATOR
Filed Nov. 2, 1949
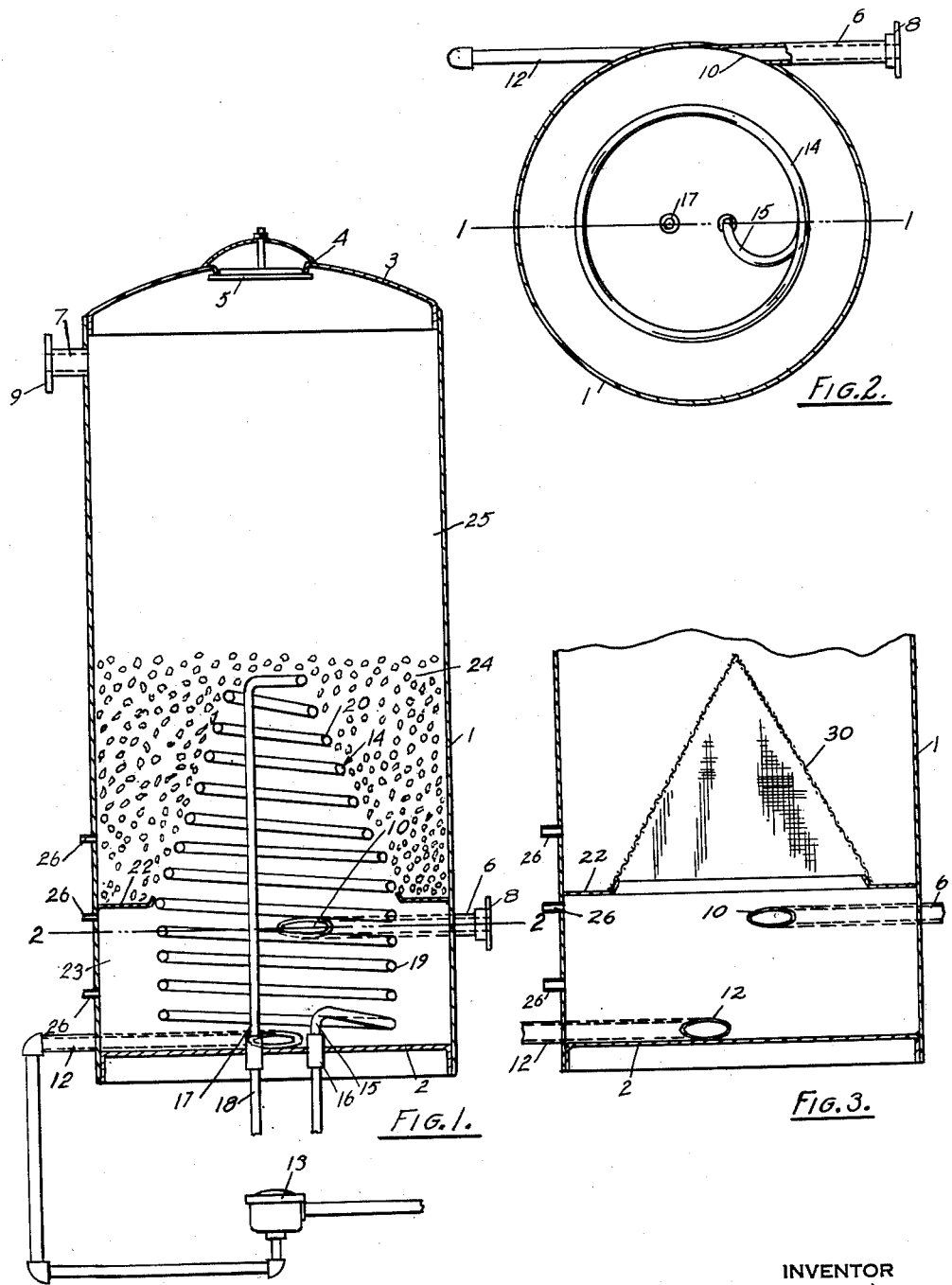
INVENTOR
Orlo C. Norton
BY
Florian G. Miller
ATTORNEY Patented June 23, 1953

2,642,951

UNITED STATES PATENT OFFICE 2,642,951

DEHYDRATOR

Orlo C. Norton, Erie, Pa.

Application November 2, 1949, Serial No. 124,986

9 Claims. (Cl. 183—4.3)

This invention relates generally to dehydrating devices and more particularly to dehydrating devices for removing the moisture in an air line or the like.

Moist air in air lines causes freezing. Air in an air line, in many instances, has very obnoxious odors. Where moist air is used to agitate an acid bath, water gets into the bath bath thereby diluting same. Where moist air is used in a paint spray, slugs of water in the spray result in the peeling of the paint. Where moist air is used to dust dies, water gets into the dies causing rusting thereof. Dry air forced into a closed room prevents corrosion therein such as a closed tank or chamber. In a beer tank, oxalic carbonate is formed when in a wet condition. It may be easily removed by placing dry air in the tank.

It is, accordingly, an object of my invention to provide a dehydrating device to dehydrate air to overcome the above results produced by moist air and it is more particularly an object of my invention to provide a dehydrating device which is simple in construction, economical in cost, economical in manufacture, and efficient in operation.

Another object of my invention is to provide a dehydrating device which removes the odor from air.

Another object of my invention is to provide a dehydrating device which removes the maximum moisture from air or gas.

Another object of my invention is to provide cooling means for a dehydrating device to prevent excessive heat.

Another object of my invention is to provide a dehydrating device which first removes the liquid or moisture in the air or gas by centrifugal force and then dehydrates the saturated air by chemical means.

Another object of my invention is to provide a dehydrating device which provides air wherein no condensation, corrosion, or freezing results in the air line or chamber.

Other objects of my invention will become evident from the following detailed description, taken in conjunction with the accompanying drawings, in which:

Fig. 1 is a vertical sectional view of my novel dehydrating device;

Fig. 2 is a view taken on the line 2—2 of Fig. 1; and

Fig. 3 is a fragmentary vertical sectional view of a modified form of my novel dehydrating device.

Referring now to the drawings, I show in Figs. 1 and 2 a cylindrical tank 1 having a flanged bottom 2 and a domed flanged head 3 on the upper end thereof. The domed head 3 has a manhole 4 with a manhole cover 5 disposed therein. The cylindrical member 1 has an inlet pipe 6 and an outlet pipe 7 on the lower and upper ends thereof respectively. The inlet pipe 6 and the outlet pipe 7 have appropriate flanges 8 and 9 to connect to any suitable pipe connection. The inlet pipe 6 extends into an inlet aperture 10 tangentially of the cylindrical member 1 so that air or gas entering the lower portion of the cylindrical member 1 moves around the inner periphery thereof thereby throwing any moisture or other heavy matter outwardly against the sides of the inner periphery of the member 1 by centrifugal force wherein it passes downwardly and outwardly through the outlet 12 which is tangential to the periphery of the tank 1. The drain outlet 12 has a suitable trap 13 therein. A helically wound cooling coil 14 has the inlet end 15 thereof connected to an inlet pipe 16 and an outlet pipe 17 thereof connected to an outlet pipe 18. The lower portion 19 of the cooling coil 14 has straight sides and the upper portion 20 thereof is conical in shape. An annular baffle 22 is disposed between the outer periphery of the cooling coil 14 and the inner periphery of the member 1 and above the inlet 10 forming a chamber 23 in the lower end of the member 1. Any suitable chemical 24 is disposed in the upper chamber 25 of the member 1 above the baffle 22 and coil 14 to remove moisture from the air passing upwardly from the chamber 23, by chemical action.

Vertically spaced cocks 26 are disposed on the side of the member 1 to determine the height of liquid in the bottom thereof.

In the operation of my novel dehydrating device, air, gas, or other fluid to be separated enters the inlet pipe 6 and the inlet aperture 10 on a tangent and moves circularly in the lower chamber 23 of the member 1 whereby all of the matter suspended in the air or other fluid will be thrown outwardly therefrom and it will gravitate to the bottom 2 of the tank 1. Water or any other heavy liquid in the fluid to be dehydrated will move outwardly by centrifugal force and downwardly to the bottom 2 of the tank 1 and will pass from the tank 1 to the drain pipe 12. The air or other fluid then passes inwardly through the lower coils 19 of the cooling coil 14 and upwardly past the annular baffle 22 and through the upper coils 20 to the chemical substance 24 in the upper chamber 25 of the member 1 wherein any remaining moisture in the air or other fluid is removed chemically after which it passes to the outlet pipe 7.

Dehydrated air passing from the outlet 7 may be used to remove aqueous deposits such as oxalic carbonate or calcium carbonate or mold. When exposed to the extremely dry air from this unit, the oxalic carbonate or calcium carbonate or mold will turn to a loose powder or will curl up and fall off or it can easily be brushed off when cleaning or refinishing tanks or other chambers.

By using various absorbent materials, impurities can be extracted from various gases and liquids.

In Fig. 3, I have shown a modified form of my invention which is identical with the dehydrating device shown in Figs. 1 and 2 except that the cooling coil 14 is eliminated and a conical shaped screen 39 is mounted on the baffle 22 in its place and stead. The operation of the device shown in Fig. 3 is the same as the operation of my novel dehydrating device shown in Figs. 1 and 2 except that there is no cooling means provided.

It will be evident from the foregoing description that I have provided a novel dehydrating device for dehydrating air, gas, or other fluids which removes a maximum amount of moisture from air or gas, which removes the odor from air, which prevents freezing, corrosion or condensation in air lines, and which has novel means for cooling the air in the dehydrator to prevent excessive heating therein.

Various changes may be made in the specific embodiment of my invention without departing from the spirit thereof or from the scope of the appended claims.

What I claim is:

1. A dehydrating device comprising a cylindrical member having an inlet chamber in the lower end thereof and an outlet in the upper end thereof, an inlet pipe connected to said inlet chamber tangent to the internal periphery of said cylindrical member, a cooling coil extending upwardly from the bottom of said cylindrical member concentric of said cylindrical member, an annular baffle defining the top of the inlet chamber disposed between said cooling coil and the inner periphery of said cylindrical member above said inlet, a source of cooling fluid for said cooling coil, a drain in the lower portion of said cylindrical member, and a dehydrating chemical substance disposed in the upper portion of said cylindrical member above said baffle and cooling coil.

2. A dehydrating device as set forth in claim 1 wherein vertically spaced cocks are disposed in the side of said cylindrical member to determine the height of liquid therein.

3. A dehydrating device as set forth in claim 1 wherein said cooling coil is helically wound and the upper portion thereof is in conical shape.

4. A dehydrating device comprising a cylindrical member having an inlet chamber and an outlet, said inlet being in the lower part thereof and said outlet being in the upper portion thereof, an inlet pipe connected to said inlet chamber tangent to the internal periphery of said cylindrical member, an apertured, horizontal baffle disposed intermediate the upper and lower portion of said cylindrical member, a drain in the lower portion of said cylindrical member, and a dehydrating chemical substance disposed in the upper portion of said cylindrical member above said baffle.

5. A dehydrating device as set forth in claim 4 wherein an open, helically wound cooling coil extends upwardly from the bottom of said cylindrical member through a central opening in said baffle and a source of cooling fluid is provided for said cooling coil.

6. A dehydrating device comprising a cylindrical tank having an inlet chamber in the lower end thereof and an outlet aperture in the upper end thereof, an inlet pipe connected to said inlet chamber tangent to the internal periphery of said cylindrical member; an open, helically wound, cylindrical cooling coil disposed concentrically in said tank and extending upwardly from the bottom thereof, an annular baffle surrounding said cooling coil disposed between said cooling coil and the inner periphery of said cylindrical member defining the top of said inlet chamber, a drain in the lower portion of said cylindrical member, and a dehydrating chemical substance for disposal in the upper portion of said cylindrical tank on said baffle and coil.

7. A dehydrating device comprising a cylindrical member having an inlet chamber and an outlet, said outlet being in the upper portion thereof, an inlet pipe connected to said inlet chamber tangent to the internal periphery of said cylindrical member and being in the lower portion of said cylindrical member, an open horizontal annular baffle defining the top of the inlet chamber disposed intermediate the inlet and outlet of said cylindrical member, a dehydrating chemical substance disposed in the upper portion of said cylindrical member on said baffle, and means disposed centrally of said baffle and cylindrical member co-operating with said baffle for holding said chemical substance in the upper portion of said cylindrical member.

8. A dehydrating device as set forth in claim 7 wherein a drain outlet is disposed in the extreme bottom portion of said cylindrical member tangentially thereof.

9. A dehydrating device as set forth in claim 7 wherein said means disposed centrally of said baffle cooperating with said baffle to hold said chemical substance in the upper portion of said cylindrical member comprises cooling coils and a source of cooling fluid for said cooling coils.

ORLO C. NORTON.

References Cited in the file of this patent

UNITED STATES PATENTS

| Number | Name | Date |
|---|---|---|
| 2,160,831 | Colby et al. | June 6, 1939 |
| 2,273,779 | Dickey et al. | Feb. 17, 1942 |
| 2,323,525 | Ebel et al. | July 6, 1943 |

FOREIGN PATENTS

| Number | Country | Date |
|---|---|---|
| 166,481 | Switzerland | Mar. 1, 1934 |